(12) United States Patent
Han et al.

(10) Patent No.: US 10,304,202 B2
(45) Date of Patent: May 28, 2019

(54) EVALUATION DEVICE FOR SKIN TEXTURE BASED ON SKIN BLOB AND METHOD THEREOF

(71) Applicant: AMOREPACIFIC CORPORATION, Seoul (KR)

(72) Inventors: Ji Yeon Han, Yongin-si (KR); Eun Joo Kim, Yongin-si (KR); Hae Kwang Lee, Yongin-si (KR); Hyunseo Kang, Yongin-si (KR)

(73) Assignee: AMOREPACIFIC CORPORATION, Seoul (KR)

( * ) Notice: Subject to any disclaimer, the term of this patent is extended or adjusted under 35 U.S.C. 154(b) by 45 days.

(21) Appl. No.: 15/247,781

(22) Filed: Aug. 25, 2016

(65) Prior Publication Data

US 2017/0263010 A1 Sep. 14, 2017

(30) Foreign Application Priority Data

Mar. 11, 2016 (KR) ........................ 10-2016-0029447

(51) Int. Cl.
*G06K 9/00* (2006.01)
*G06T 7/40* (2017.01)
*G06T 7/00* (2017.01)

(52) U.S. Cl.
CPC .............. *G06T 7/40* (2013.01); *G06T 7/0016* (2013.01); *G06T 2207/10024* (2013.01); *G06T 2207/20024* (2013.01); *G06T 2207/30088* (2013.01)

(58) Field of Classification Search
CPC ............. G06T 2207/30088; G06T 7/40; G06T 2207/10024; G06T 2207/30096; G06T 7/90; A61B 5/442; A61B 5/441; A61B 5/444; A61B 5/445; A61B 5/443; G06K 9/4652

See application file for complete search history.

(56) References Cited

U.S. PATENT DOCUMENTS

| 6,081,612 A * | 6/2000 | Gutkowicz-Krusin ...................... A61B 5/0071 382/128 |
| 8,337,405 B2 * | 12/2012 | Waagen .................. G06T 7/269 382/218 |
| 2006/0269111 A1* | 11/2006 | Stoecker ............... G06F 19/321 382/128 |
| 2007/0040907 A1* | 2/2007 | Kern .................... A61B 5/0059 348/77 |
| 2008/0194928 A1* | 8/2008 | Bandic .................. G16H 15/00 600/306 |

(Continued)

FOREIGN PATENT DOCUMENTS

JP 2006-61170 A 3/2006

*Primary Examiner* — Bhavesh M Mehta
*Assistant Examiner* — Ian L Lemieux
(74) *Attorney, Agent, or Firm* — Merchant & Gould P.C.

(57) ABSTRACT

Embodiments relate to an evaluation device for a skin texture based on a skin blob, which includes a skin blob determining unit configured to determine a skin blob in a skin image, a skin blob information measuring unit configured to measure at least one of a gross area, an average area, a number, a gross border length, an average border length, a direction and an angle of the skin blob in the skin image, and a skin texture evaluating unit configured to evaluate a skin texture of the skin image based on the measurement result; and an evaluation method thereof.

14 Claims, 8 Drawing Sheets

(56) References Cited

U.S. PATENT DOCUMENTS

| | | | | |
|---|---|---|---|---|
| 2008/0304736 A1* | 12/2008 | Nakagawa | A61B 5/0059 | 382/165 |
| 2009/0054744 A1* | 2/2009 | Kitamura | A61B 5/0082 | 600/306 |
| 2010/0185064 A1* | 7/2010 | Bandic | A61B 5/0059 | 600/306 |
| 2011/0218428 A1* | 9/2011 | Westmoreland | A61B 6/00 | 600/425 |
| 2011/0301441 A1* | 12/2011 | Bandic | A61B 5/0059 | 600/306 |
| 2012/0307032 A1* | 12/2012 | Gomi | A61B 5/0077 | 348/77 |
| 2015/0086104 A1* | 3/2015 | Miyamoto | G06T 7/0012 | 382/133 |
| 2016/0063312 A1* | 3/2016 | Hara | A61B 5/0077 | 382/103 |
| 2016/0135730 A1* | 5/2016 | Arai | A61B 5/444 | 600/306 |
| 2017/0270350 A1* | 9/2017 | Maltz | G06K 9/00281 | |

* cited by examiner

EVALUATION DEVICE FOR SKIN TEXTURE BASED ON SKIN BLOB AND METHOD THEREOF

CROSS-REFERENCE TO RELATED APPLICATION

This application claims priority to Korean Patent Application No. 10-2016-0029447, filed on Mar. 11, 2016, and all the benefits accruing therefrom under 35 U.S.C. § 119, the contents of which in its entirety are herein incorporated by reference.

BACKGROUND

1. Field

The present disclosure relates to an evaluation device for a skin texture and a method thereof, and more particularly, to an evaluation device for a skin texture and a method thereof, which uses a shape and size of a skin blob.

2. Description of the Related Art

In an existing skin texture measurement, a height of a skin texture is calculated using a projection device to generate a three-dimensional image, and the generated three-dimensional skin image is provided to a user. However, the projection device is expensive, and even though a three-dimensional image is acquired, it is difficult for a user to directly understand whether a state of the skin texture is improved.

RELATED LITERATURES

Patent Literature (Patent Literature 1) Japanese Unexamined Patent Publication No. 2006-61170 (Mar. 9, 2006)

SUMMARY

In order to solve the above problem, a device and method capable of evaluating a state of a skin texture on the basis of a skin image is demanded.

In an aspect of the present disclosure, there is provided an evaluation device for a skin texture based on a skin blob, comprising: a skin blob determining unit configured to determine a skin blob in a skin image; a skin blob information measuring unit configured to measure at least one of a gross area, an average area, a number, a gross border length, an average border length, a direction and an angle of the skin blob in the skin image; and a skin texture evaluating unit configured to evaluate a skin texture of the skin image based on the measurement result.

In an embodiment, the skin blob determining unit may filter the skin image and determine a closed area formed by skin wrinkles over a predetermined size as the skin blob.

In an embodiment, the skin texture evaluating unit may give a higher score to a skin texture of the skin image as the average area or the average border length of the skin blob is smaller.

In an embodiment, the skin texture evaluating unit may give a higher score to a skin texture of the skin image as the number or the gross border length of the skin blob is greater. Here, the number or the gross border length may be associated with skin blobs existing in the same area.

In an embodiment, the evaluation device may further include a skin image display unit configured to display the skin image, and the skin image display unit may emphasize a border of the skin blob when displaying the skin image.

In an embodiment, the skin image display unit may display a skin blob greater than a predetermined size or smaller than a predetermined size distinguishably from other skin textures.

In an embodiment, the skin image display unit may display the skin image as at least one of a pseudo color image, a binarized image, and a three-dimensionally transformed image.

In another aspect of the present disclosure, there is provided an evaluation method for a skin texture based on a skin blob, comprising: determining a skin blob in a skin image; measuring at least one of a gross area, an average area, a number, a gross border length, an average border length, a direction and an angle of the skin blob in the skin image; and evaluating a skin texture of the skin image based on the measurement result.

In an embodiment, in the determining of a skin blob, the skin image may be filtered, and a closed area formed by skin wrinkles over a predetermined size may be determined as the skin blob.

In an embodiment, in the evaluating of a skin texture of the skin image, a higher score may be given to a skin texture of the skin image as the average area or the average border length of the skin blob is smaller.

In an embodiment, in the evaluating of a skin texture of the skin image, a higher score may be given to a skin texture of the skin image as the number or the gross border length of the skin blob is greater.

In an embodiment, the evaluation method may further include displaying a skin image, and in the displaying of the skin image, a border of the skin blob may be emphasized.

In an embodiment, in the displaying of the skin image, a skin blob greater than a predetermined size or smaller than a predetermined size may be displayed distinguishably from other skin textures.

In an embodiment, in the displaying of the skin image, the skin image may be displayed as at least one of a binarized image, a pseudo color image, and a three-dimensionally transformed image.

In another aspect of the present disclosure, there is provided a program recorded on a computer-readable storage medium, which includes commands for executing the evaluation method for a skin texture as described above.

In another aspect of the present disclosure, there is provided a computer-readable storage medium for storing the evaluation method for a skin texture as described above.

According to an embodiment of the present disclosure, a two-dimensional enlarged skin image may be acquired using a cheap camera, and a skin texture may be evaluated by analyzing the corresponding image. When evaluating a skin texture, a user may easily recognize a skin blob, and thus the user may instantly perceive a state of the skin.

In addition, since the skin texture is evaluated using the number, area, border length, angle, direction or the like of skin blobs, an evaluation result may be rapidly provided, and a skin state may be rapidly evaluated using a simple computing device.

DETAILED DESCRIPTION

Figure 1:
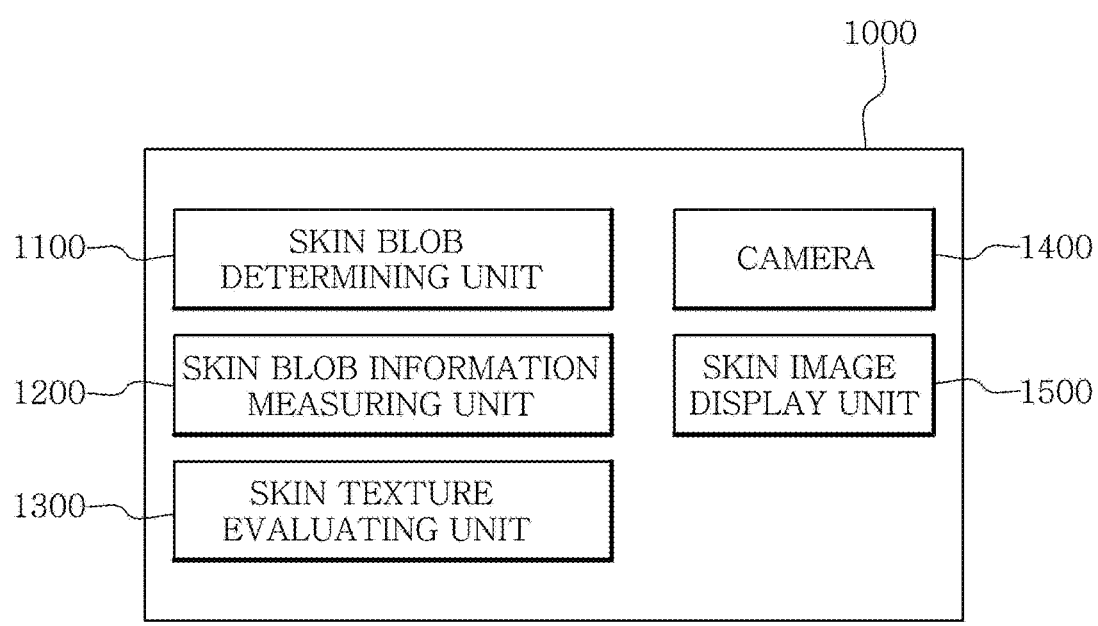
FIG. 1 is a block diagram showing an evaluation device 1000 for a skin texture based on a skin blob according to an embodiment of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. In the drawings, like reference numerals denote like elements. In the description, details of well-known features and techniques may be omitted to avoid unnecessarily obscuring the presented embodiments. The shape, size and regions, and the like, of the drawing may be exaggerated for clarity.

The embodiments described in the specification may be implemented as hardware entirely, hardware partially and software partially, or software entirely. In the specification, the term "unit", "module", "device", "system" or the like indicates a computer-related entity like hardware, a combination of hardware and software, or software. For example, the term "unit", "module", "device", "system" or the like used in the specification may be a process, a processor, an object, an executable file, a thread of execution, a program, and/or a computer, without being limited thereto. For example, both a computer and an application executed in the computer may correspond to the term "unit", "module", "device", "system" or the like in the specification.

The embodiments have been described with reference to the flowchart shown in the figure. For brief explanation, the method has been illustrated and described as a series of blocks, but the present disclosure is not limited to the order of the blocks. In other words, some blocks may be executed simultaneously with other blocks or in a different order from those illustrated and described in this specification, and various diverges, flow paths, block sequences may also be implemented if they give the equivalent or similar results. In addition, in order to implement the method described in the specification, it is also possible not to demand all blocks. Further, the method for predicting a surgery stage may be implemented in the form of a computer program for executing a series of processes, and the computer program may also be recorded on a computer-readable recording medium.

Hereinafter, embodiments of the present disclosure will be described in detail with reference to the drawings.

FIG. 1 is a block diagram showing an evaluation device 1000 for a skin texture based on a skin blob according to an embodiment of the present disclosure. Referring to FIG. 1, the evaluation device 1000 for a skin texture based on a unit skin blob includes a skin blob determining unit 1100, a skin blob information measuring unit 1200 and a skin texture evaluating unit 1300. In other embodiments, the evaluation device 1000 for a skin texture based on a skin blob may further include a camera 1400 or a skin image display unit 1500. The camera 1400 may comprise at least one of CCD camera, magnifying glass, and infrared camera, the present disclosure is not limited thereto.

The evaluation device 1000 for a skin texture based on a skin blob may analyze a skin blob in a skin image acquired by means of the camera 1400 and evaluate a skin texture.

Figure 2:
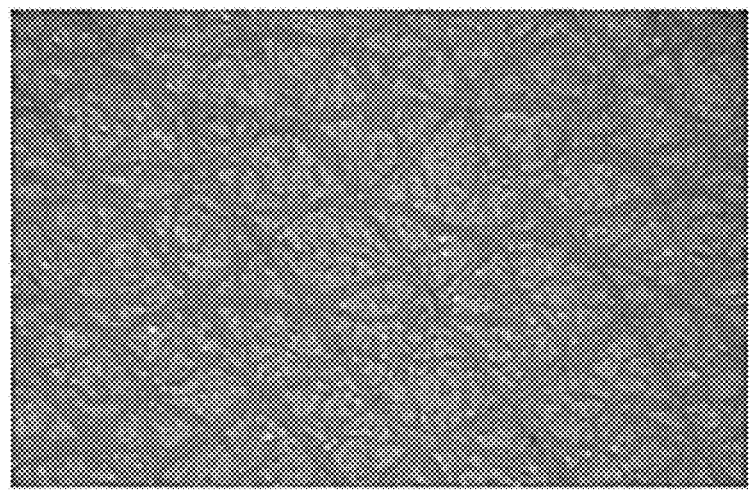
FIG. 2 is a skin image obtained by photographing the skin of a user.
Figure 3:
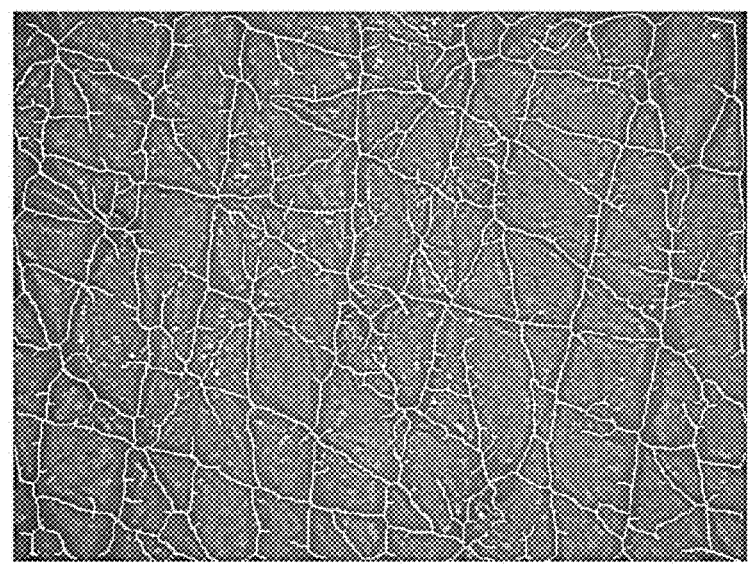
FIG. 3 is a skin image in which a wrinkle portion is emphasized.
Figure 4:
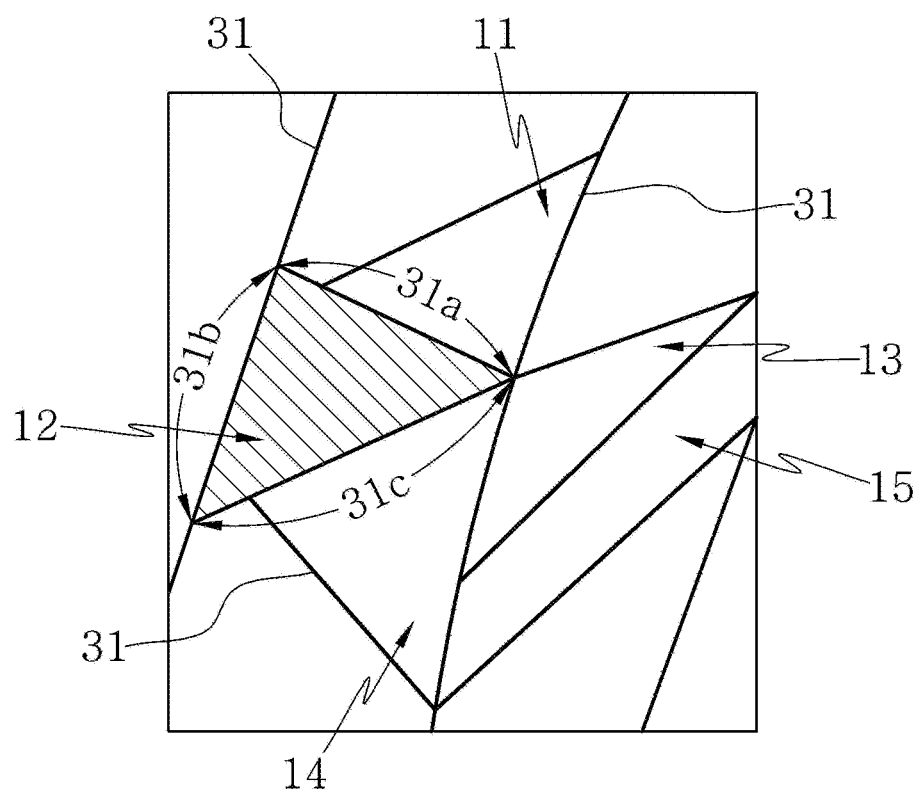
FIG. 4 is a diagram showing a skin image in which skin wrinkles and skin blobs are simplified.

FIG. 2 is a skin image obtained by photographing the skin of a user, FIG. 3 is a skin image in which a wrinkle portion is emphasized, and FIG. 4 is a diagram showing a skin image in which skin wrinkles and skin blobs are simplified. In the specification, the term "skin blob" may mean a closed area surrounded by skin wrinkles.

The skin blob determining unit 1100 may determine (or, recognize) a skin blob in a skin image. For this, as shown in FIG. 2, the skin blob determining unit 1100 may processes the skin image acquired by means of the camera to recognize a wrinkle portion. For example, by using different colors of a wrinkle portion and an unwrinkled portion (skin blob), the wrinkle portion may be distinguished, and a skin blob may be determined. The wrinkle portion recognized as above may be marked with a line 31 as shown in FIG. 4. Here, in order to represent every unit skin blob, each unit may also be expressed as a cell.

Referring to FIG. 4, skin blobs 11-15 . . . of various shapes and sizes are shown due to skin wrinkles 31. Even though the skin wrinkles are displayed with straight lines in FIG. 4, actual skin wrinkles may include irregular curves as shown in FIG. 3. In addition, in FIG. 4, circumferences of the skin blob 12 are composed of skin wrinkles 31a, 31b, 31c.

In an embodiment, the skin blob determining unit 1100 may filter the skin image and determine a closed area formed by skin wrinkles over a predetermined size as the skin blob. By the above filtering process, noise caused by minute wrinkles may be reduced.

As described above, the skin blob determining unit 1100 may extract a skin blob from the acquired skin image.

The skin blob information measuring unit 1200 may measure at least one of a gross area, an average area, a number, a gross border length, an average border length, a direction and an angle of the skin blob in the skin image.

The skin blob information measuring unit 1200 may measure the above skin blob information with respect to a predetermined skin area in the skin image. For example, referring to FIG. 4, the skin blob 12 has a border length of $31a+31b+31c$. In this way, the skin blob information measuring unit 1200 may also measure border lengths of other skin blobs. In addition, based on a predetermined area, a gross area, an average area, a number, a gross border length, an average border length, a direction, an angle or the like of the skin blob may be measured.

Figure 5A:
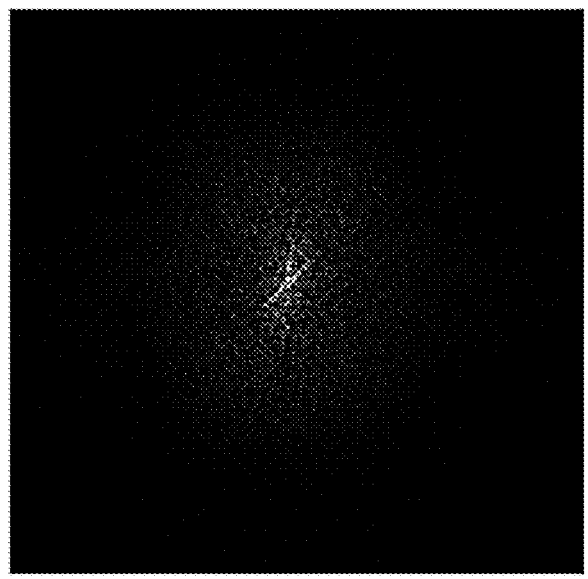
FIGS. 5A and 5B show measurement results of direction and angle of skin blobs measured by a skin blob information measuring unit 1200 according to an embodiment.
Figure 5B:
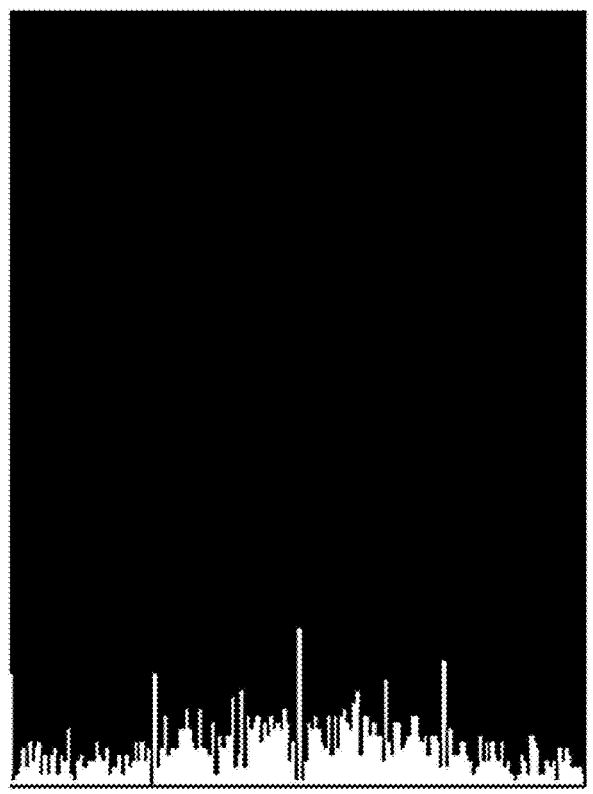

FIGS. 5A and 5B show measurement results of direction and angle of skin blobs measured by the skin blob information measuring unit 1200 according to an embodiment. In FIG. 5A, directions of all skin blobs are displayed in a three-dimensional space. Referring to FIG. 5A, in the corresponding skin image, the skin blobs have a direction of 2.01. In addition, in FIG. 5B, an x axis represents 360 degrees at an angle of 0 (zero), and a y axis represents an angle component of the skin blob in the image.

The skin texture evaluating unit 1300 may evaluate the skin texture of the skin image on the basis of the measurement results. For example, the skin texture evaluating unit 1300 may give a higher score to a skin texture of the skin image as the average area or the average border length of the skin blob is smaller.

An aged skin texture is composed of greater skin blobs in comparison to a young skin texture. As the skin is aged, skin wrinkles increase and are merged with peripheral skin wrinkles, and thus the size of the skin blob increases gradually.

Therefore, as the average area or the average border length of the skin blob within a skin region to be inspected is smaller, the corresponding skin region may be regarded as being composed of smaller skin blobs. Therefore, the skin texture evaluating unit 1300 may give a higher score to a skin texture of the skin image as the average area or the average border length of the skin blob is smaller.

For this reason, the skin texture evaluating unit 1300 may give a higher score to a skin texture of the skin image as the number or the gross border length of the skin blob is greater. This is because, as the number or the gross border length of skin blobs within a skin region to be inspected is smaller, the corresponding skin region may be regarded as being composed of smaller skin blobs.

Also, in an embodiment, the skin texture evaluating unit 1300 may evaluate the skin as an ideal skin if the directions of the skin blobs are uniform in all directions. This is because the direction of skin texture means minute wrinkles, and a healthy skin blob has a triangular shape.

In an embodiment, the skin texture evaluating unit 1300 may evaluate efficacy of a product by comparing states of the same skin portion before and after applying the product for skin improvement. For example, if the number of skin blobs in a predetermined area is 10 before a product is used and the number of skin blobs increases 13 after the product is used, the corresponding product may be evaluated as giving a positive effect in the improvement of the skin texture.

In another embodiment, the skin texture evaluating unit 1300 may estimate a skin age by comparing measured information of skin blobs (a border length, a number, a direction, an angle, an area or the like) with a reference value. For example, if the number of skin blobs in a predetermined area is 11 to 20, the skin age may be estimated as early thirties, and if the number of skin blobs in a predetermined area is 21 to 30, the skin age may be estimated as late twenties.

In another embodiment, an identifier may be given to each skin blob. When comparing states before and after a product for skin improvement is applied to the skin, the change of each skin blob may be checked by means of the identifier. The identifier may be expressed with at least one of number, letter and color. In addition, the skin image display unit 1500 may display an area or peripheral length of each skin blob. As a result, a user may easily recognize the change of an area or peripheral length of each skin blob after a cosmetic is used.

Figure 6:
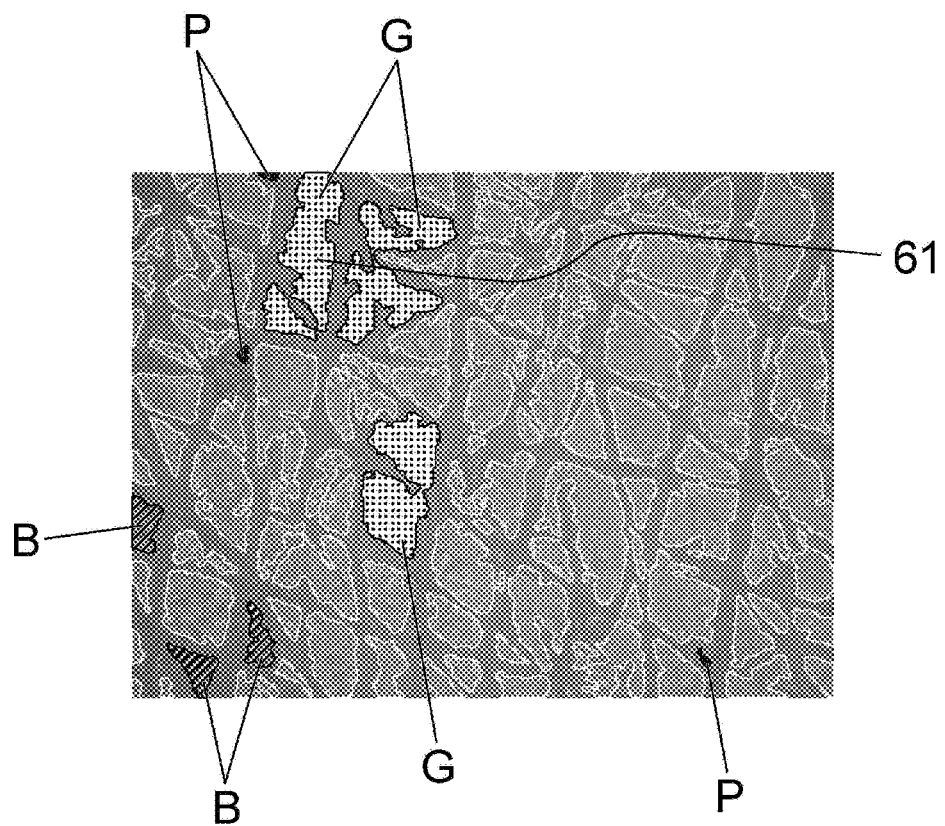
FIG. 6 is a skin image in which predetermined skin blobs are distinguishably marked.

For example, referring to FIG. 6, if a single skin blob 61 has an area of 6 and the area of the skin blob 61 is reduced to 5 after a product is used, a state of the skin texture may be evaluated by observing the change of area of an individual skin blob.

Even though the above description is based on the number or area of skin blobs, the present disclosure is not limited thereto, but skin blob information such as a gross area, an average area, a number, a gross border length, an average border length, a direction and an angle may be used in single or in combination. For example, the skin texture evaluating unit 1300 may estimate a skin age or evaluate skin texture improvement in consideration of the number and the average area of skin blobs.

The skin texture evaluating unit 1300 may also evaluate a skin texture on the basis of the uniformity of shape and size of skin blobs. For example, if skin blobs have uniform shape and size, the corresponding skin may be evaluated as in a good state.

In other case, in an embodiment, the evaluation device 1000 may build a shape and size database of skin blobs of each body portion depending on age, and the skin texture evaluating unit 1300 may evaluate a state of the skin texture by comparing the measured shape and size of skin blobs of a specific body portion with data in the database. For example, since skin blobs of the nose, the cheek and the jaw have different shapes, reference skin blob information of each body portion may be stored and compared with the measured skin blob information. The skin texture may be evaluated by comparing the measured skin blob with the reference skin blob.

In an embodiment, the evaluation device 1000 for a skin texture based on a skin blob may further include the skin image display unit 1500 for displaying the skin image. FIGS. 2 and 3 are skin images displayed by the skin image display unit 1500. The skin image display unit 1500 may emphasize a border of a skin blob in the displayed skin image so that a user may easily check the size and shape of the skin blob. For example, the skin image display unit 1500 may mark lines at the skin wrinkles as shown in FIG. 3. In another embodiment, skin wrinkles smaller than a predetermined size may not be displayed.

FIG. 6 is a skin image in which predetermined skin blobs are distinguishably marked. As shown in FIG. 6, the skin image display unit 1500 may play skin blobs greater or smaller than a predetermined size to be distinguished from other skin textures. Referring to FIG. 6, the skin image display unit 1500 may display borders in green (G), pink (P), blue (B) or the like depending on sizes of skin blobs in the skin image.

Figure 7A:
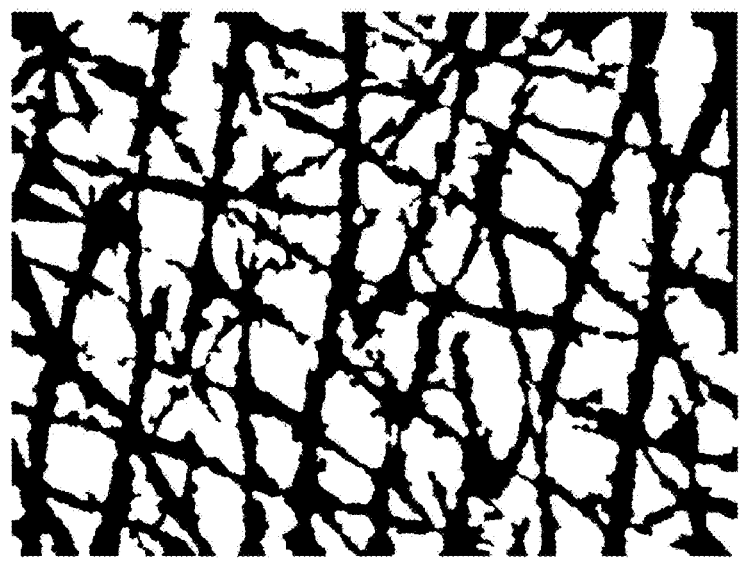
FIG. 7A to 7C are diagrams in which the skin image is binarized or three-dimensionally transformed.
Figure 7B:
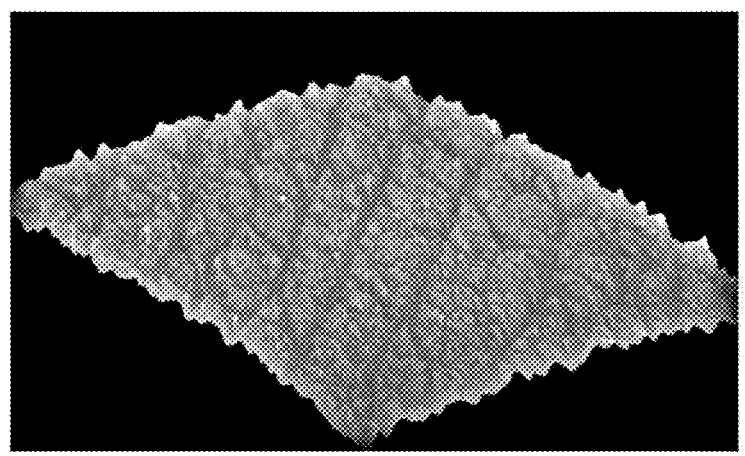
Figure 7C:
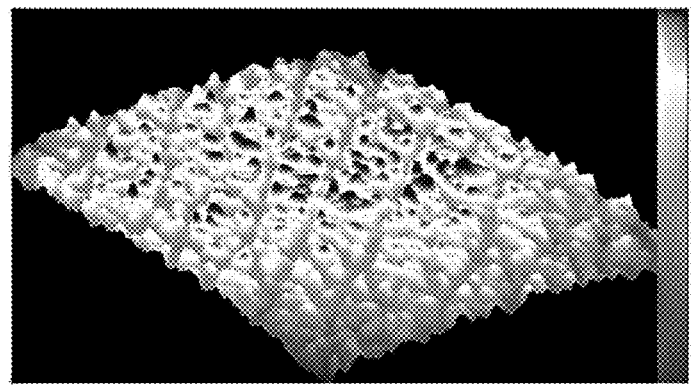

FIG. 7A to 7C are diagrams in which the skin image is binarized or three-dimensionally transformed. As shown in FIG. 7A to 7C, the skin image display unit 1500 may display a skin image in a binarized state or in a three-dimensionally transformed state. FIG. 7A is an image obtained by filtering a skin image to configure skin blobs based on skin wrinkles of a certain size and then binarizing the corresponding image. The binarized image as shown in FIG. 7A allows a user to more clearly check the shape of a skin blob.

In addition, FIGS. 7B and 7C are images obtained by three-dimensionally transforming a skin image. FIG. 7B shows a case where an original skin color is applied, and FIG. 7C shows a case where a pseudo color is applied. A height of the skin blob or the like may be checked together by using the three-dimensionally transformed image as shown in FIGS. 7B and 7C.

Meanwhile, for the three-dimensional transformation, any existing technique for obtaining a three-dimensional image from a two-dimensional image may be used, and also a sensor may be used in addition to a camera in order to obtain three-dimensional information.

In an embodiment, the skin image display unit 1500 may group and display an original skin image, a binarized image, an image emphasizing skin wrinkles, an image distinguishably displaying certain skin blobs from other skin blobs, a three-dimensionally transformed image or the like.

If height information of a skin blob is obtained, the skin texture evaluating unit 1300 may evaluate a skin texture by combining the above information of the skin blob (area, border length, number or the like) with the height information of the skin blob. For example, if skin blobs have a low or uniform average height, the skin texture may be evaluated as in a good state.

Figure 8:
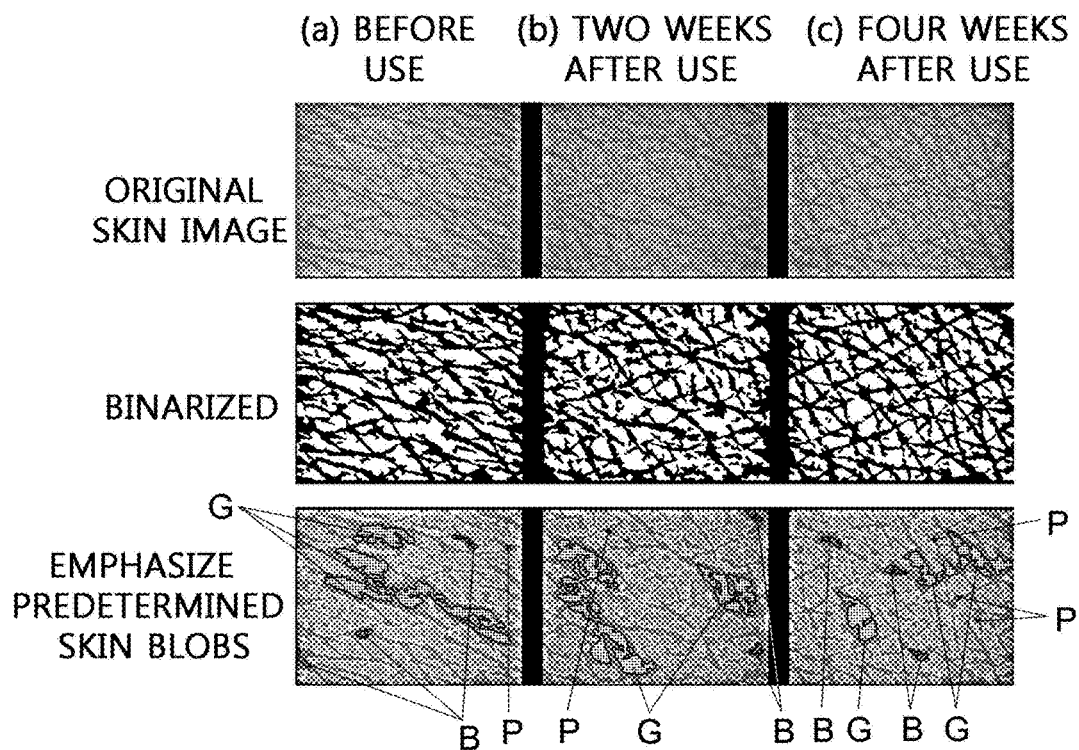
FIG. 8 shows experiment results obtained by observing the change of skin blobs, after a specific skin improvement product is used to the same skin region according to an embodiment of the present disclosure.

FIG. 8 shows experiment results obtained by observing the change of skin blobs, after a specific skin improvement product is used to the same skin region according to an embodiment of the present disclosure. In FIG. 8, (A) shows a state before the skin improvement product is used, (B) shows a state two weeks after the skin improvement product is used, and (C) shows a state four weeks after the skin improvement product is used.

According to the experiment result of FIG. 8, it was found that the average area of skin blobs was 1639 pixels before use and was reduced to 1341 pixels (−18.18%) after two weeks and to 1351s pixel (−17.57%) after four weeks, and thus the size of the skin texture decreases. Also, it was found that the number of skin blobs was 110.5 before use and was increased to 126.1 (+14.12%) after two weeks and to 125.4 (+13.48%) after four weeks, and thus the skin texture became denser. In addition, it was found that the gross border length of skin blobs was 30566 pixels before use and was increased to 31415 pixels (+2.78%) after two weeks and to 32079 pixels (+4.95%) after four weeks, and thus the skin texture became smaller and denser. When checking the improvement of skin texture as above, as shown in FIG. 8, an original skin image, a binarized image, and an image displaying skin blobs of a certain size distinguishably from other skin blobs (here, the borders are displayed in green (G) or blue (B)) may be displayed together so that a user may understand the change of skin blobs in various ways.

Figure 9:
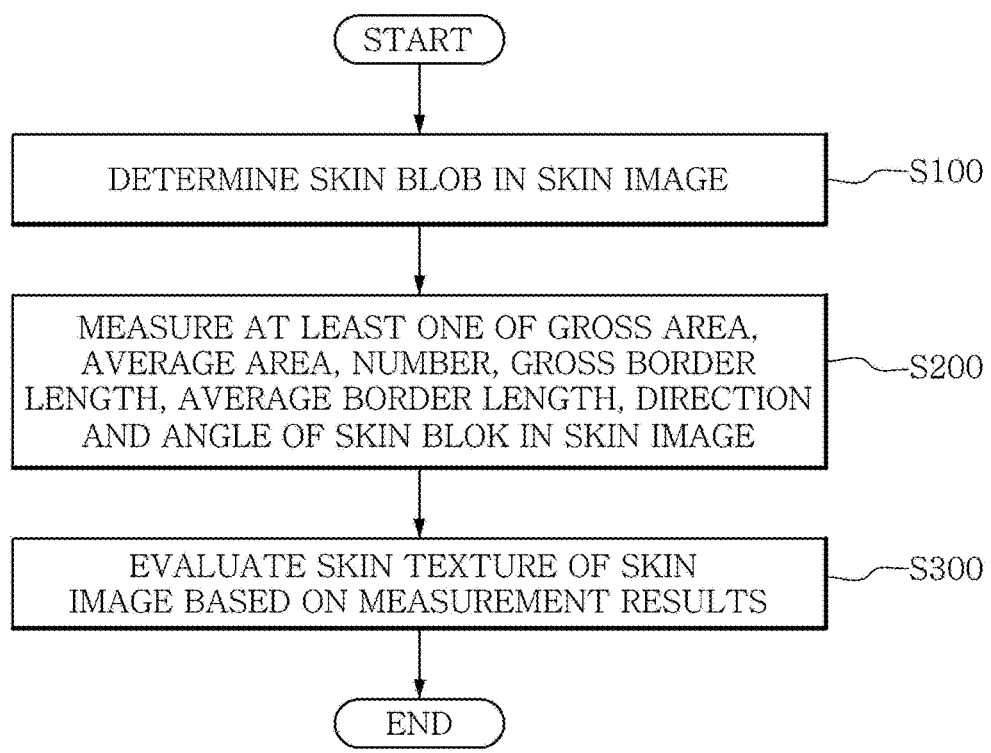
FIG. 9 is a flowchart for illustrating an evaluation method for a skin texture based on a skin blob according to an embodiment of the present disclosure.

FIG. 9 is a flowchart for illustrating an evaluation method for a skin texture based on a skin blob according to an embodiment of the present disclosure. The evaluation method for a skin texture based on a skin blob may be performed by components of the evaluation method for a skin texture based on a skin blob as described above.

Referring to FIG. 9, the evaluation method for a skin texture based on a skin blob includes determining a skin blob in a skin image (S100), measuring at least one of a gross area, an average area, a number, a gross border length, an average border length, a direction and an angle of the skin blob in the skin image (S200), and evaluating a skin texture of the skin image based on the measurement result (S300).

In S100 for determining a skin blob, the skin image may be filtered, and a closed area formed by skin wrinkles over a predetermined size may be determined as the skin blob.

In addition, in S300 for evaluating a skin texture of the skin image, a higher score may be given to a skin texture of the skin image as the average area or the average border length of the skin blob is smaller. In addition, in S300 for evaluating a skin texture of the skin image, a higher score may also be given to a skin texture of the skin image as the number or the gross border length of the skin blob is greater.

In an embodiment, the evaluation method for a skin texture based on a skin blob may further include displaying the skin image. In the step of displaying the skin image, a border of the skin blob may be emphasized, and a skin blob greater than a predetermined size or smaller than a predetermined size may be displayed distinguishably from other skin textures. In addition, in the step of displaying the skin image, the skin image may be displayed as a binarized image or a three-dimensionally transformed image.

A program according to an embodiment of the present disclosure includes commands for executing the evaluation method for a skin texture based on a skin blob as described above, and the program may be recorded on a computer-readable storage medium.

In addition, a computer-readable storage medium according to an embodiment of the present disclosure may store commands for executing the evaluation method for a skin texture based on a skin blob as described above.

Even though the present disclosure has been explained with reference to the embodiments depicted in the figures, they are just examples, and it will be understood by those skilled in the art that various changes and modifications may be made therefrom. However, such changes or modifications should be regarded as falling within the scope of the present disclosure. Therefore, the true scope of the present disclosure must be defined by the appended claims.

What is claimed is:

1. An evaluation device for a skin texture based on a skin blob, comprising:

an evaluation device comprising a skin blob determining processor configured to determine a closed area formed by skin wrinkles as the skin blob in a skin image, the skin wrinkles distinguished by using different colors of the skin image;

a skin blob information measuring processor configured to measure at least one of a direction and an angle of the skin blob in the skin image; and a skin texture evaluating processor configured to evaluate a skin texture of the skin image based on the measurement result, wherein the skin blob information measuring processor is configured to further measure at least one of a gross area, an average area, a number, a gross border length, an average border length of the skin blob in the skin image, wherein the skin texture evaluating processor is configured to further give a higher score to a skin texture of the skin image as a number of the skin blob is greater when the information to the number of the skin blob is measured, wherein the skin texture evaluating processor is configured to further give a higher score to a skin texture of the skin image as the gross border length of the skin blob is measured.

2. The evaluation device for a skin texture based on a skin blob according to claim 1, wherein the skin blob determining processor is configured to further filter the skin image and determines a closed area formed by the skin wrinkles over a predetermined size as the skin blob.

3. The evaluation device for a skin texture based on a skin blob according to claim 1, wherein the skin texture evaluating processor is configured to further give a higher score to a skin texture of the skin image as the average area or the average border length of the skin blob is smaller when the information to the number of the skin blob or the information to the average border length of the skin blob is measured.

4. The evaluation device for a skin texture based on a skin blob according to claim 1, further comprising:
a skin image display configured to display the skin image, wherein the skin image display emphasizes a border of the skin blob when displaying the skin image.

5. The evaluation device for a skin texture based on a skin blob according to claim 4, wherein the skin image display displays a skin blob greater than a predetermined size or smaller than a predetermined size distinguishably from other skin textures.

6. The evaluation device for a skin texture based on a skin blob according to claim 4, wherein the skin image display displays the skin image as at least one of a pseudo color image, a binarized image, and a three-dimensionally transformed image.

7. The evaluation device for a skin texture based on a skin blob according to claim 1, wherein the evaluation device further comprises at least one of CCD camera, magnifying glass, and infrared camera.

8. An evaluation method for a skin texture based on a skin blob, comprising:
applying a evaluation device comprising a skin blob determining processor configured to determine a closed area formed by skin wrinkles as the skin blob in a skin image, the skin wrinkles distinguished by using different colors of the skin image;
a skin blob information measuring processor configured to measure at least one of a direction and an angle of the skin blob in the skin image; and
a skin texture evaluating processor configured to evaluate a skin texture of the skin image based on the measurement result,
wherein the skin blob information measuring processor is configured to further measure at least one of a gross area, an average area, a number, a gross border length, an average border length of the skin blob in the skin image, determining a closed area formed by skin wrinkles as the skin blob in a skin image, the skin wrinkles distinguished by using different colors of the skin image;
measuring at least one of a direction and an angle of the skin blob in the skin image and at least one of a gross area, an average area, a number, a gross border length, an average border length of the skin blob in the skin image; and
evaluating a skin texture of the skin image based on the measurement result,
wherein in the evaluating of a skin texture of the skin image, a higher score is given to a skin texture of the skin image as the number of the skin blob is greater when the information to the number of the skin blob is measured,
wherein in the evaluating of a skin texture of the skin image, a higher score is given to a skin texture of the skin image as the gross border length of the skin blob is greater when the information to the gross border length of the skin blob is measured.

9. The evaluation method for a skin texture based on a skin blob according to claim 8, wherein in the determining of a skin blob, the skin image is filtered, and a closed area formed by the skin wrinkles over a predetermined size is determined as the skin blob.

10. The evaluation method for a skin texture based on a skin blob according to claim 8, wherein in the evaluating of a skin texture of the skin image, a higher score is given to a skin texture of the skin image as the average area or the average border length of the skin blob is smaller when the information to the number of the skin blob or the information to the average border length of the skin blob is measured.

11. The evaluation method for a skin texture based on a skin blob according to claim 8, further comprising:
displaying the skin image,
wherein in the displaying of the skin image, a border of the skin blob is emphasized.

12. The evaluation method for a skin texture based on a skin blob according to claim 11, wherein in the displaying of the skin image, a skin blob greater than a predetermined size or smaller than a predetermined size is displayed distinguishably from other skin textures.

13. The evaluation method for a skin texture based on a skin blob according to claim 11, wherein in the displaying of the skin image, the skin image is displayed as at least one of a binarized image, a pseudo color image, and a three-dimensionally transformed image.

14. A non-transitory computer-readable storage medium, which includes commands for executing the evaluation method for a skin texture according to claim 8.

* * * * *